US011801779B2

(12) United States Patent
Kim et al.

(10) Patent No.: US 11,801,779 B2
(45) Date of Patent: Oct. 31, 2023

(54) SEAT FOR VEHICLE

(71) Applicants: Hyundai Motor Company, Seoul (KR); Kia Corporation, Seoul (KR); DAE WON SAN UP CO., LTD, Gwacheon-Si (KR)

(72) Inventors: Eun Sue Kim, Gyeonggi-do (KR); Dong Woo Jeong, Gyeonggi-do (KR); Myung Hoe Kim, Seoul (KR); Dae Hee Lee, Incheon (KR); Min Ki Jeon, Gyeonggi-do (KR); Jae Kwang Shin, Incheon (KR)

(73) Assignees: Hyundai Motor Company, Seoul (KR); Kia Corporation, Seoul (KR); Dae Won San Up Co., Ltd, Gyeonggi-do (KR)

( * ) Notice: Subject to any disclaimer, the term of this patent is extended or adjusted under 35 U.S.C. 154(b) by 0 days.

(21) Appl. No.: 17/878,377

(22) Filed: Aug. 1, 2022

(65) Prior Publication Data
US 2023/0191963 A1   Jun. 22, 2023

(30) Foreign Application Priority Data
Dec. 16, 2021   (KR) .................. 10-2021-0180804

(51) Int. Cl.
*B60N 2/30*   (2006.01)
*B60N 2/04*   (2006.01)
(52) U.S. Cl.
CPC ............. *B60N 2/3065* (2013.01); *B60N 2/04* (2013.01)

(58) Field of Classification Search
CPC .......... B60N 2/3065; B60N 2/04; B60N 2/14; B60N 2002/022
USPC ........................................... 297/14
See application file for complete search history.

(56) References Cited

U.S. PATENT DOCUMENTS

| 1,747,717 | A | * | 2/1930 | Hummert | B60N 2/3011 248/240.4 |
| 5,984,397 | A | * | 11/1999 | Dawson | B60N 2/307 297/14 |
| 6,460,922 | B1 | * | 10/2002 | Demick | B60N 2/3068 297/14 |
| 6,460,929 | B2 | * | 10/2002 | Kamida | B60N 2/3011 297/14 |
| 6,974,184 | B1 | * | 12/2005 | Moffa | B60N 2/3011 297/14 |
| 7,954,873 | B2 | * | 6/2011 | Abe | B60N 2/3043 296/65.09 |
| 8,109,554 | B2 | * | 2/2012 | Undevik | B60N 2/245 296/65.04 |
| 8,616,624 | B2 | * | 12/2013 | Yamada | B60N 2/986 296/65.09 |
| 2003/0214168 | A1 | * | 11/2003 | Schambre | B60N 2/856 297/391 |

(Continued)

FOREIGN PATENT DOCUMENTS

KR   10-2008-0054526 A   6/2008

*Primary Examiner* — Milton Nelson, Jr.
(74) *Attorney, Agent, or Firm* — Fox Rothschild LLP

(57) ABSTRACT

A seat for a vehicle is provided. In the seat for a vehicle, a second row center seat and a second row side seat are mounted using a partition located behind a driver seat, and the second row center seat is configured to have a movable structure and a mounting location thereof is movable toward the partition wall or a vehicle body side part when necessary.

18 Claims, 10 Drawing Sheets

(56) References Cited

U.S. PATENT DOCUMENTS

2004/0113451 A1\* 6/2004 Szymanski ........ B60N 2/01516
296/65.05

\* cited by examiner

SEAT FOR VEHICLE

CROSS REFERENCE TO RELATED APPLICATION

The present application is based on and claims under 35 U.S.C. § 119(a) the benefit of Korean Patent Application No. 10-2021-0180804, filed Dec. 16, 2021, the entire contents of which is incorporated herein for all purposes by this reference.

TECHNICAL FIELD

Embodiments of the present disclosure relate generally to a seat for a vehicle and, more particularly, to a seat for a vehicle including a second row center seat and a second row side seat mounted to a partition wall separating a driver seat and a rear space of the driver seat.

BACKGROUND

A multi-purpose vehicle can accommodate not only passengers but also luggage in the indoor space of the vehicle.

In the multi-purpose vehicle, a front passenger seat is not provided at a side portion of a driver's seat, and a carrier that can load and store luggage can be installed in a space of the front passenger seat.

Furthermore, in the multi-purpose vehicle with the carrier mounted to the space of the front passenger seat, in order to accommodate as many occupants as possible in a limited indoor space, second row seats may be mounted to a partition wall separating a driver seat from a rear space of the driver seat and third row seats may be located behind the second row seats.

As described above, the conventional multi-purpose vehicle with the carrier mounted to the space of the front passenger seat and the second row seats mounted to the partition wall located behind the driver seat has a fixed structure where the second row seats are immovable, and there is a problem in that the usability of the second row seats is low.

Specifically, the carrier located in the space of the front passenger seat is preferably configured to be slidingly movable in a longitudinal direction of the vehicle for ease of storing and taking out luggage. However, as the second row seats of the conventional multi-purpose vehicle are mounted in the unmovable fixed structure, when the carrier in the space of the front passenger seat is moved rearward, interference between the second row seats and the carrier occurs. Therefore, the carrier in the space of the front passenger seat cannot be moved rearward and the work of storing and taking out luggage is inconveniently performed.

The foregoing described as the controller and the controlling method of operating a fuel cell is intended merely to aid in the understanding of the background of the present disclosure, and is not intended to mean that the present disclosure falls within the purview of the related art that is already known to those skilled in the art.

SUMMARY

Embodiments of the present disclosure provide a seat for a vehicle, wherein the seat includes a second row center seat and a second row side seat mounted to a partition wall located behind a driver seat. Among the seats, the second row center seat is configured to be movable and to be changed in a mounting location when necessary, and the usability of second row seats is improved to improve the productivity of the seat, and specifically, rearward sliding movement of a carrier in a space of a front passenger seat is possible to improve the convenience in a work of storing and taking out luggage using the carrier.

An exemplary embodiment relates to a seat for a vehicle, the seat including: a second row center seat and a second row side seat that may be mounted to a partition wall located behind a driver seat and be configured to face third rows seats, wherein the second row center seat may be mounted in a rotatable structure, and configured to be changed in a location thereof into a locked state to the partition wall or to a vehicle body side part between the second row seats and the third row seats.

In some embodiments, when the second row center seat may be locked to the partition wall, the second row side seat may be located at a side portion of the vehicle body side part, and the second row center seat may be located at a side portion of the second row side seat.

In some embodiments, the second row side seat may include: a seatback part securely mounted to the partition wall to be immovable; and a cushion part configured to perform tip-up movement such that the cushion part may be rotatably unfolded or folded upward with respect to the seatback part.

In some embodiments, the second row center seat may be coupled to a main pipe; a first end of the main pipe may be rotatably coupled to the vehicle body side part by a medium of a shaft; and the second row center seat may be configured to be changed in a location thereof toward the partition wall and the vehicle body side part by rotation of the main pipe.

In some embodiments, a two-way striker protruding toward opposite sides of the main pipe may be securely coupled to the main pipe; and the partition wall and the vehicle body side part may be respectively coupled to a first latch and a second latch that may be coupled to the two-way striker and maintain a locking state.

In some embodiments, the second row center seat may include a first seating portion and a second seating portion coupled to the main pipe to be rotatable with respect to the main pipe; and the first seating portion and the second seating portion may be configured to perform tip-up movement such that the first seating portion and the second seating portion may be separately rotated and unfolded perpendicularly to each other or folded upward and overlap each other.

In some embodiments, a gas spring connecting the first seating portion to the second seating portion may be configured to allow the first seating portion and the second seating portion to perform separate tip-up movements.

In some embodiments, in a state where the two-way striker is coupled to the first latch on the partition wall, when the first seating portion stands up vertically and the second seating portion is unfolded longitudinally, an occupant may be able to sit on the second seating portion unfolded longitudinally.

In some embodiments, in a state where the two-way striker is coupled to the second latch on the vehicle body side part, when the second seating portion stands up vertically and the first seating portion is unfolded transversally, an occupant may be able to sit on the first seating portion unfolded transversally.

In some embodiments, in a state where the two-way striker is coupled to the first latch on the partition wall, when the cushion part of the second row side seat and the second seating portion of the second row center seat are unfolded longitudinally, a seating mode where an occupant may be able to sit in a rear-facing posture using the cushion part of the second row side seat and the second seating portion of the second row center seat unfolded longitudinally is provided.

In some embodiments, in a state where the two-way striker is coupled to the first latch of the partition wall, when the cushion part of the second row side seat is tipped up and folded upward, and the second seating portion of the second row center seat are tipped-up and folded upward, a rear seat luggage loading mode where luggage may be loadable in a rear seat space between the second row seats and the third row seats may be provided.

In some embodiments, in a state where the two-way striker is coupled to the second latch on the vehicle body side part, when the cushion part of the second row side seat is tipped up and folded upward and the second seating portion of the second row center seat is tipped up and folded upward, a front seat luggage take-out mode where rear sliding movement of a carrier in a front passenger seat space may be possible may be provided.

In some embodiments, in a state where the two-way striker is coupled to the second latch on the vehicle body side part, when the cushion part of the second row side seat is unfolded longitudinally and the first seating portion of the second row center seat is unfolded transversally, a bed mode where an occupant may be able to rest using the longitudinally-unfolded cushion part of the second row side seat and the transversally-unfolded first seating portion of the second row center seat and the third row seats may be provided.

In some embodiments, as described above, the seat for a vehicle according to the present disclosure includes the second row center seat and the second row side seat that are mounted using the partition wall located behind the driver seat. Among the seats, the second row center seat has the movable structure, so that the mounting location of the second row center seat is movable toward the partition wall or the vehicle body side part when necessary. Therefore, as the usability of the second row seats is increased, the productivity of the seat can be improved, and specifically, the rearward sliding movement of the carrier located in the space of the front passenger seat is possible, and the convenience in the work of storing and taking out luggage using the carrier can be improved.

As discussed, the method and system suitably include use of a controller or processer.

In another embodiment, vehicles are provided that comprise a seat as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
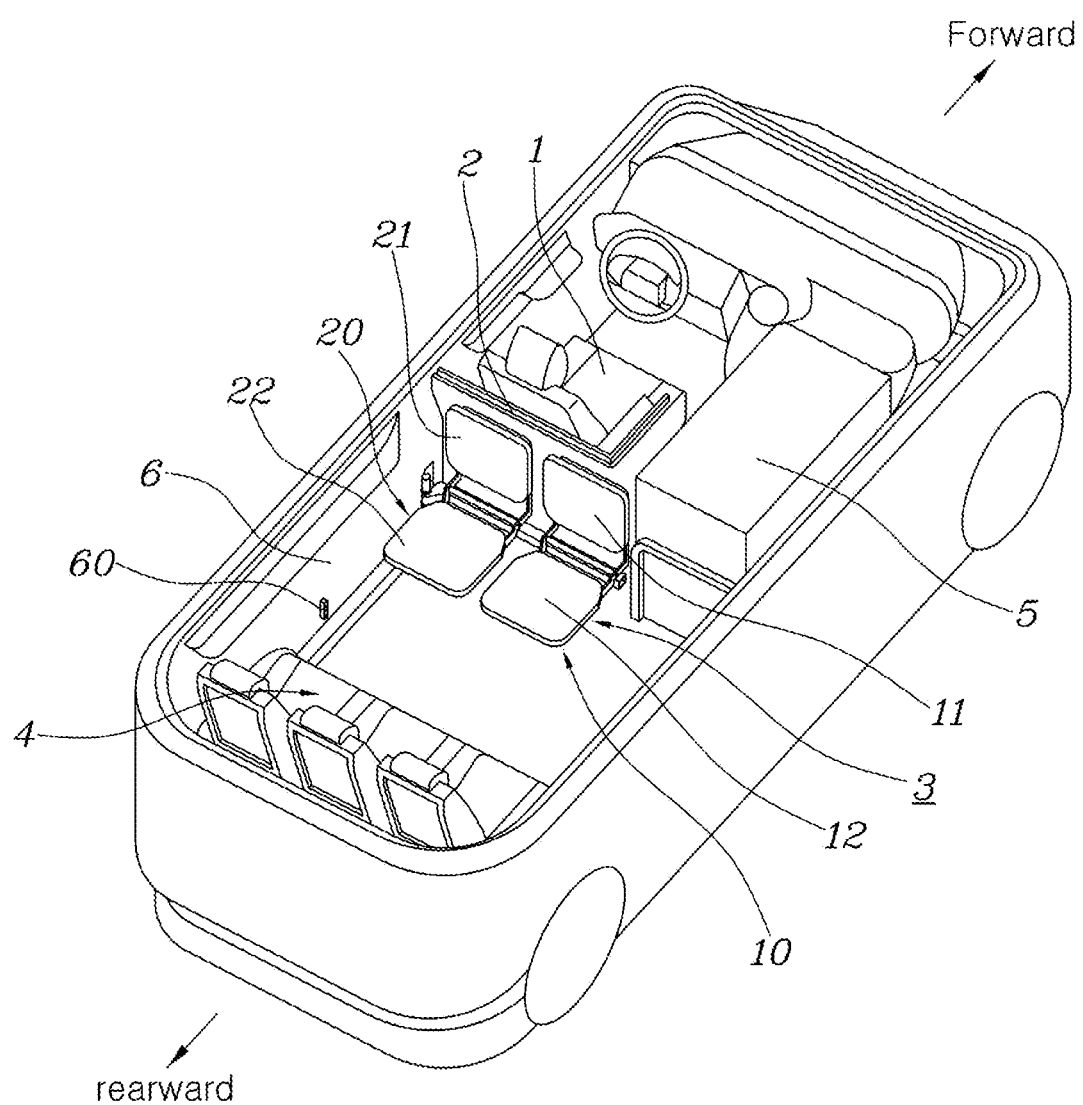
FIG. 1 is a view showing a vehicle including second row seats according to the present disclosure, wherein the second seats are in a seating mode where an occupant is able to sit in a rear-facing posture.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

The controller CR according to the embodiment of the present disclosure may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

Hereinbelow, a seat for a vehicle according to an exemplary embodiment of the present disclosure with reference to accompanying drawings.

As shown in FIGS. 1 to 10, the seat for a vehicle according to the present disclosure is arranged such that second row seats 3 according to the present disclosure is mounted using a partition wall 2 mounted to separate a driver seat 1 of the vehicle from a rear space of the driver seat 1, and third row seats 4 is mounted at the rear side spaced apart from the second row seats 3.

Then, at a side portion of the driver seat 1, in place of the front passenger seat, a carrier 5 capable of loading and storing luggage by using a space to which the front passenger seat is mounted may be mounted into the space to be longitudinally slidable.

As described above, a vehicle including the carrier 5 mounted into the space of the front passenger seat, the second row seats 3 mounted using the partition wall 2 located behind the driver seat 1, and the third row seats 4 mounted behind the second row seats 3 may be generally referred to as a multi-purpose vehicle.

The second row seats 3 according to the present disclosure may include a second row center seat 10 and a second row side seat 20.

The second row center seat 10 may be mounted in a movable structure and may be changed in the location thereof into a state where the second row center seat 10 is locked to the partition wall 2 and a state where the second row center seat 10 is locked to a vehicle body side part 6 between the second row seats 3 and the third row seats 4.

In other words, the second row center seat 10 may be movable by rotary movement, thereby being selectively locked to the partition wall 2 located behind the driver seat 1 and to the vehicle body side part 6 between the second row seats 3 and the third row seats 4.

On the other hand, the second row side seat 20 may be securely mounted to the partition wall 2, whereby the second row side seat 20 is immovable from the partition wall 2 toward different locations and is located on the partition wall 2 at all times.

According to the present disclosure, on the basis of a state where the second row center seat 10 is located at and locked to the partition wall 2, the second row seats 3 may be configured such that the second row side seat 20 is located at a side portion of the vehicle body side part 6, and the second row center seat 10 is located at a side portion of the second row side seat 20.

The second row side seat 20 may include a seatback part 21 securely mounted to the partition wall 2 to be immovable, and a cushion part 22 configured to perform tip-up movement (or up folding movement) such that the cushion part 22 is rotatably unfolded or folded upward with respect to the seatback part 21.

When an occupant is seated on the second row side seat 20, the seatback part 21 is a portion supporting the upper body of the occupant and the cushion part 22 is a portion supporting the lower body of the occupant.

According to the present disclosure, a main pipe 30 may be located below the second row center seat 10 and the second row center seat 10 and the main pipe 30 may be integrally coupled to each other. A first end of the main pipe 30 may be rotatably coupled to the vehicle body side part 6 by a medium of a shaft 31.

Therefore, the main pipe 30 may be rotated on the shaft 31, and as the main pipe 30 is rotated, the location of the second row center seat 10 may be movable toward the partition wall 2 and the vehicle body side part 6.

The main pipe 30 may be securely coupled to a two-way striker 40 protruding toward opposite sides of the main pipe 30. The partition wall 2 and the vehicle body side part 6 may be respectively coupled to a first latch 50 and a second latch 60 that are coupled to the two-way striker 40 to maintain a locking state.

According to the present disclosure, the second row center seat 10 may include a first seating portion 11 and a second seating portion 12 that are coupled to the main pipe 30 to be rotatable with respect to the main pipe 30.

The main pipe 30 may be coupled to a fixation bracket, a frame of the first seating portion 11 may be coupled to a bracket, and a first pipe passing through the first bracket may be coupled to the fixation bracket. Then, the first seating portion 11 may be rotatably coupled to the first pipe together with the first bracket, so that the first seating portion 11 is rotatably coupled to the main pipe 30.

Furthermore, a second bracket may be coupled to a frame of the second seating portion 12, and the fixation bracket of the main pipe 30 and a second pipe passing through the second bracket may be coupled to each other. Therefore, as the second seating portion 12 is coupled to the second pipe to be rotatable with the second bracket, the second seating portion 12 may have a structure where the second seating portion 12 is rotatably coupled to the main pipe 30.

The first seating portion 11 and the second seating portion 12 of the second row center seat 10 may be configured to be separately rotated on the main pipe 30. As the first seating portion 11 and the second seating portion 12 are separately rotated, the tip-up movement in which the first seating portion 11 and the second seating portion 12 may be unfolded perpendicularly to each other as shown in FIG. 5 or are folded upward and overlapping each other as shown in FIG. 2 is possible.

Two gas springs 70 may be installed in the main pipe 30 by a medium of a bracket. Rod portions of the two gas springs 70 are respectively connected to the first seating portion 11 and the second seating portion 12 of the second row center seat 10. Therefore, the first seating portion 11 and the second seating portion 12 of the second row center seat 10 are configured to separately perform the tip-up movement by operations of the gas springs 70.

Figure 2:
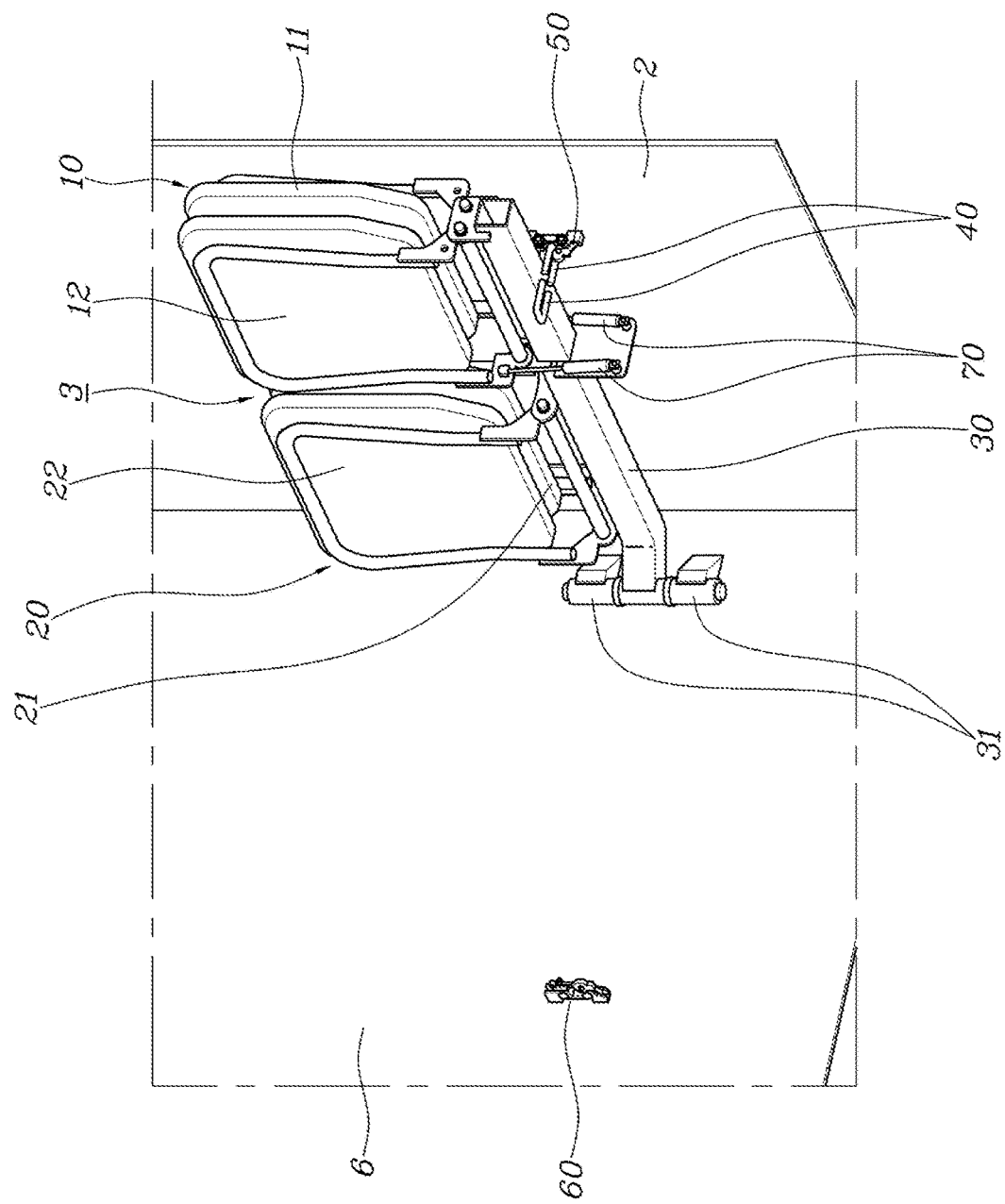
FIG. 2 is a view showing a second row center seat and a second row side seat according to the present disclosure, wherein in a state where the second row center seat and the second row side seat are locked to a partition wall, a second seating portion of the second row center seat and a cushion part of the second row side seat are tipped up.
Figure 3:
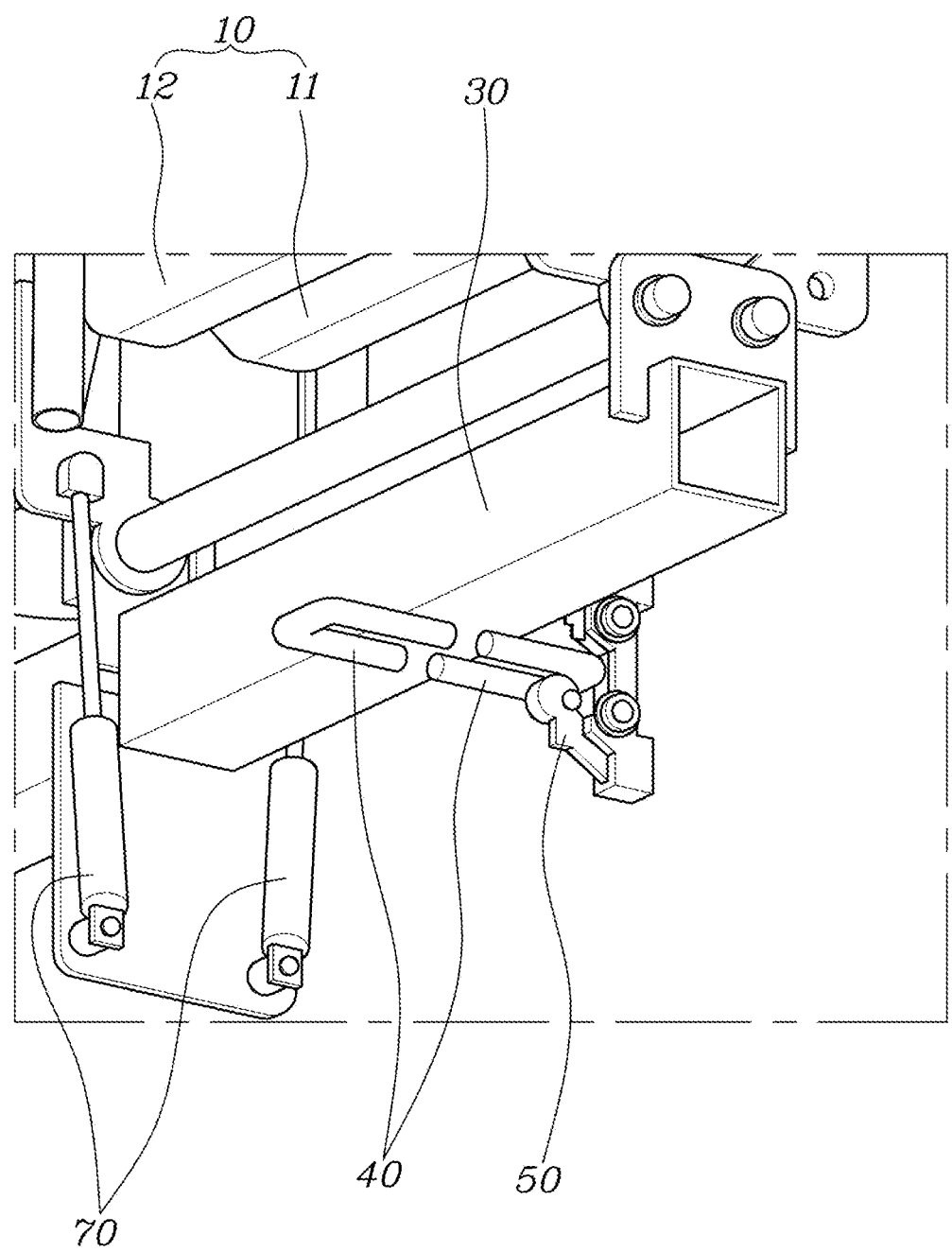
FIG. 3 is an enlarged view showing a portion where a two-way striker and a first latch in FIG. 2 are coupled to each other.
Figure 4:
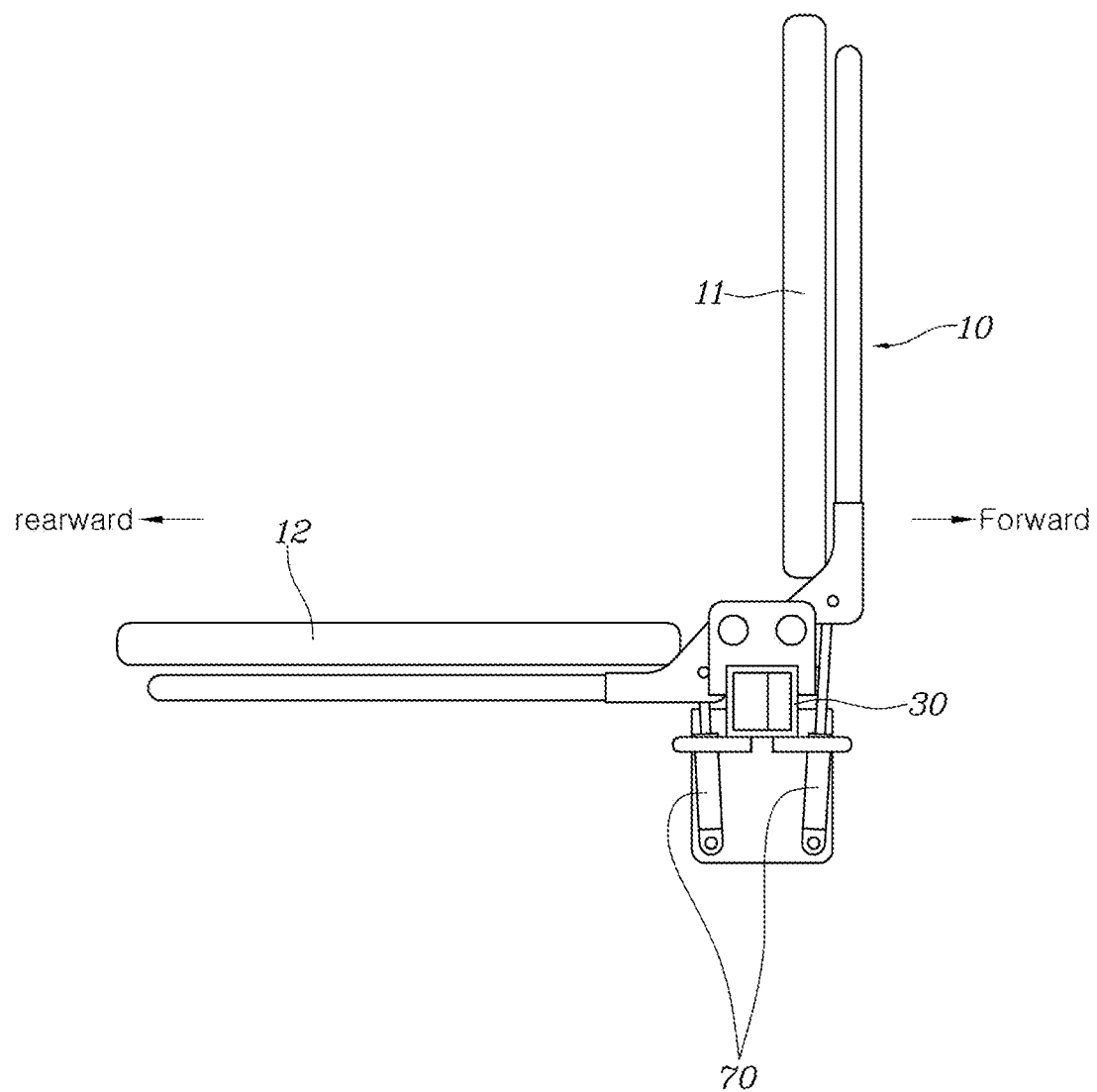
FIG. 4 is a side view showing the second seating portion of the second row center seat in FIG. 2, and the second seating portion is rotated rearward and unfolded longitudinally.

As shown in FIG. 2, the two-way striker 40 may be coupled to the first latch 50 on the partition wall 2 by rotation of main pipe 30, the second row center seat 10 is located at the partition wall 2 located behind the driver seat 1 and is locked. In the above state, as shown in FIG. 4, when the first seating portion 11 stands up vertically and the second seating portion 12 is rotated rearward and unfolded longitudinally, the occupant can sit on the second seating portion 12 unfolded longitudinally.

Figure 5:
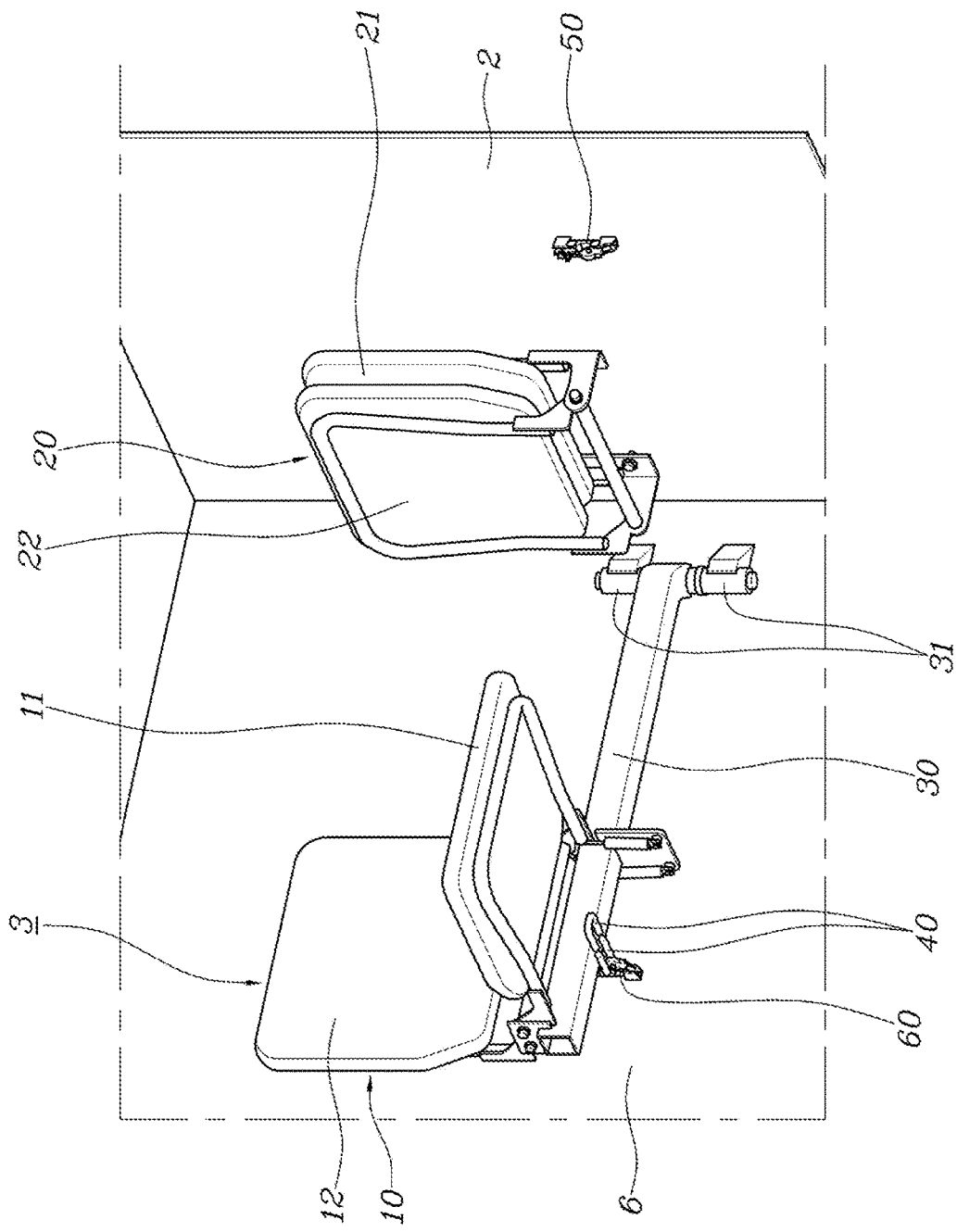
FIG. 5 is a view showing the second row center seat is moved toward a vehicle body side part and is locked by rotation of a main pipe in FIG. 2 and a first seating portion of the second row center seat is rotated sideways and is unfolded transversally.
Figure 6:
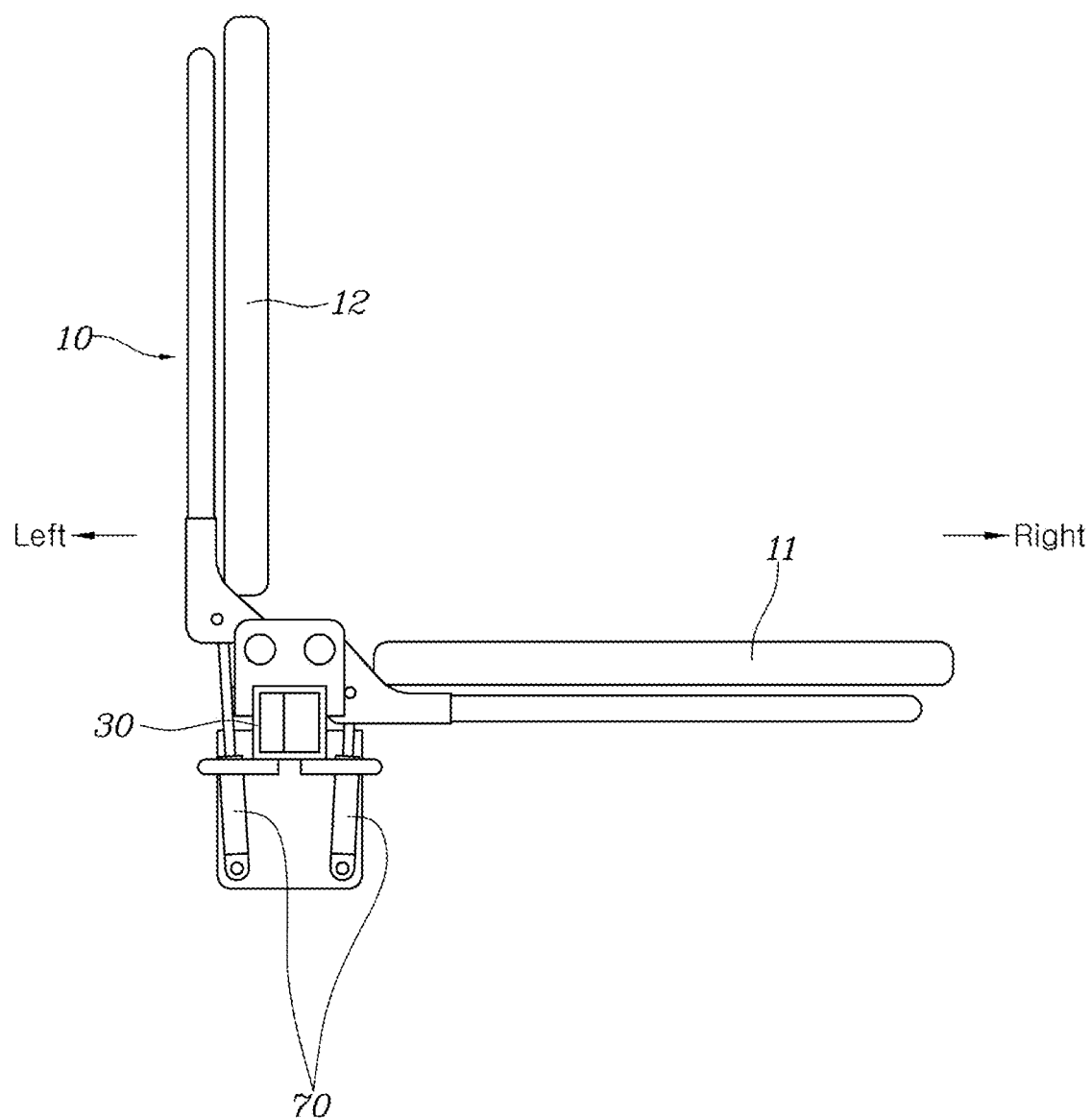
FIG. 6 is a side view showing the second row center seat in FIG. 5.

Then, as shown in FIG. 5, when the two-way striker 40 is coupled to the second latch 60 on the vehicle body side part 6 by rotation of the main pipe 30, the second row center seat 10 may enter a state where the second row center seat 10 is located at the vehicle body side part 6 and is locked. In the above state, as shown in FIG. 6, when the second seating portion 12 stands up vertically and the first seating portion 11 is rotated sideways and unfolded transversally, the occupant may sit on the first seating portion 11 unfolded transversally.

According to the embodiment of the present disclosure, when the two-way striker 40 is coupled to the first latch 50 on the partition wall 2 by rotation of the main pipe 30, both the second row center seat 10 and the second row side seat 20 may enter a state of being located at and locked to the partition wall 2 behind the driver seat 1, as shown in FIG. 1. In the above state, when both the cushion part 22 of the second row side seat 20 and the second seating portion 12 of the second row center seat 10 are rotated rearward and unfolded longitudinally, a seating mode in which an occupant can sit in a rear-facing posture on the cushion part 22 of the second row side seat 20 and the second seating portion 12 of the second row center seat 10 unfolded longitudinally is implemented.

Figure 7:
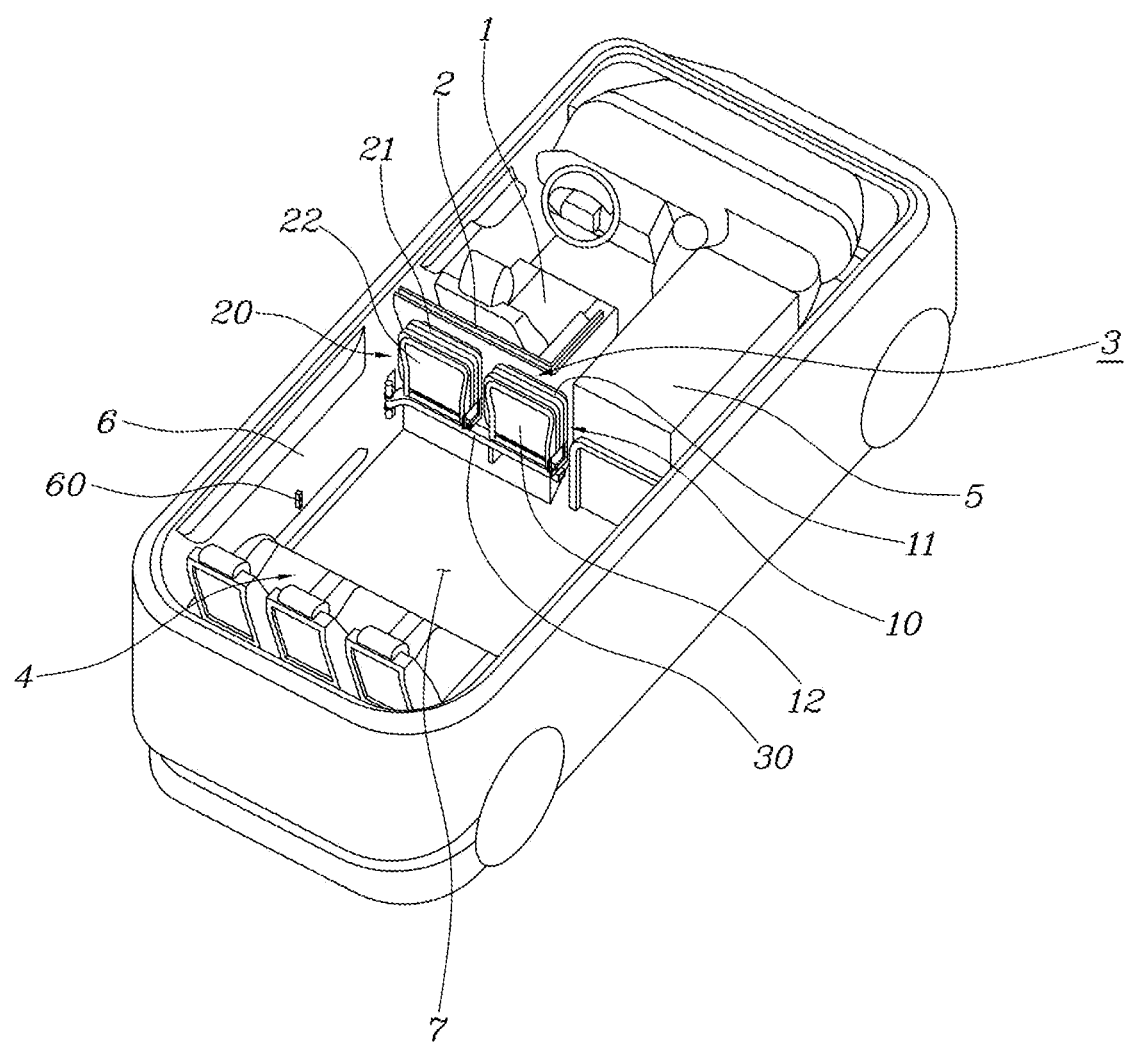
FIGS. 7 to 10 are views showing a rear seat luggage loading mode, a front seat luggage take-out mode, and a bed mode according to the present disclosure.

Furthermore, as the two-way striker 40 is coupled to the first latch 50 on the partition wall 2, both the second row center seat 10 and the second row side seat 20 may be locked to the partition wall 2 behind the driver seat 1, as shown in FIG. 7. In the above state, when the cushion part 22 of the second row side seat 20 is tipped up and folded upward and the second seating portion 12 of the second row center seat 10 is tipped up and folded upward, a rear seat space 7 between the second row seats 3 and the third row seats 4 is widened, and a rear seat luggage loading mode capable of loading luggage by using the widened rear seat space 7 is implemented.

Figure 8:
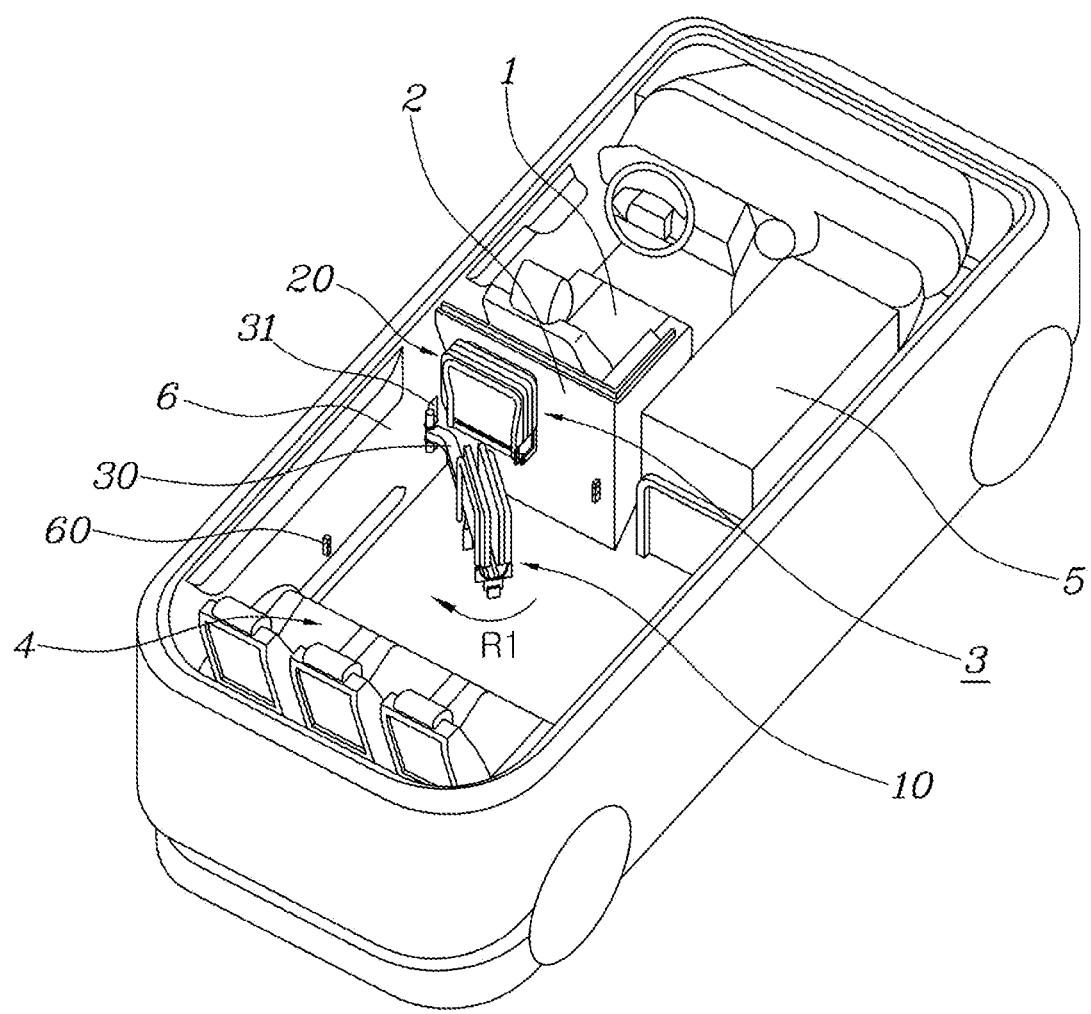

From the state of FIG. 7, coupling between the two-way striker 40 and the first latch 50 may be released and then the main pipe 30 may be rotated on the shaft 31 along arrow R1 as shown in FIG. 8. Then, the second row center seat 10 may be moved from the partition wall 2 toward the vehicle body side part 6 by rotation of the main pipe 30.

The second row center seat 10 moved toward the vehicle body side part 6 by rotation of the main pipe 30 may be locked in a state of being moved toward the vehicle body side part 6 as the two-way striker 40 is coupled to the second latch 60 on the vehicle body side part 6.

Herein, the second row side seat 20 may also continue to be locked to the partition wall 2 behind the driver seat 1.

Figure 9:
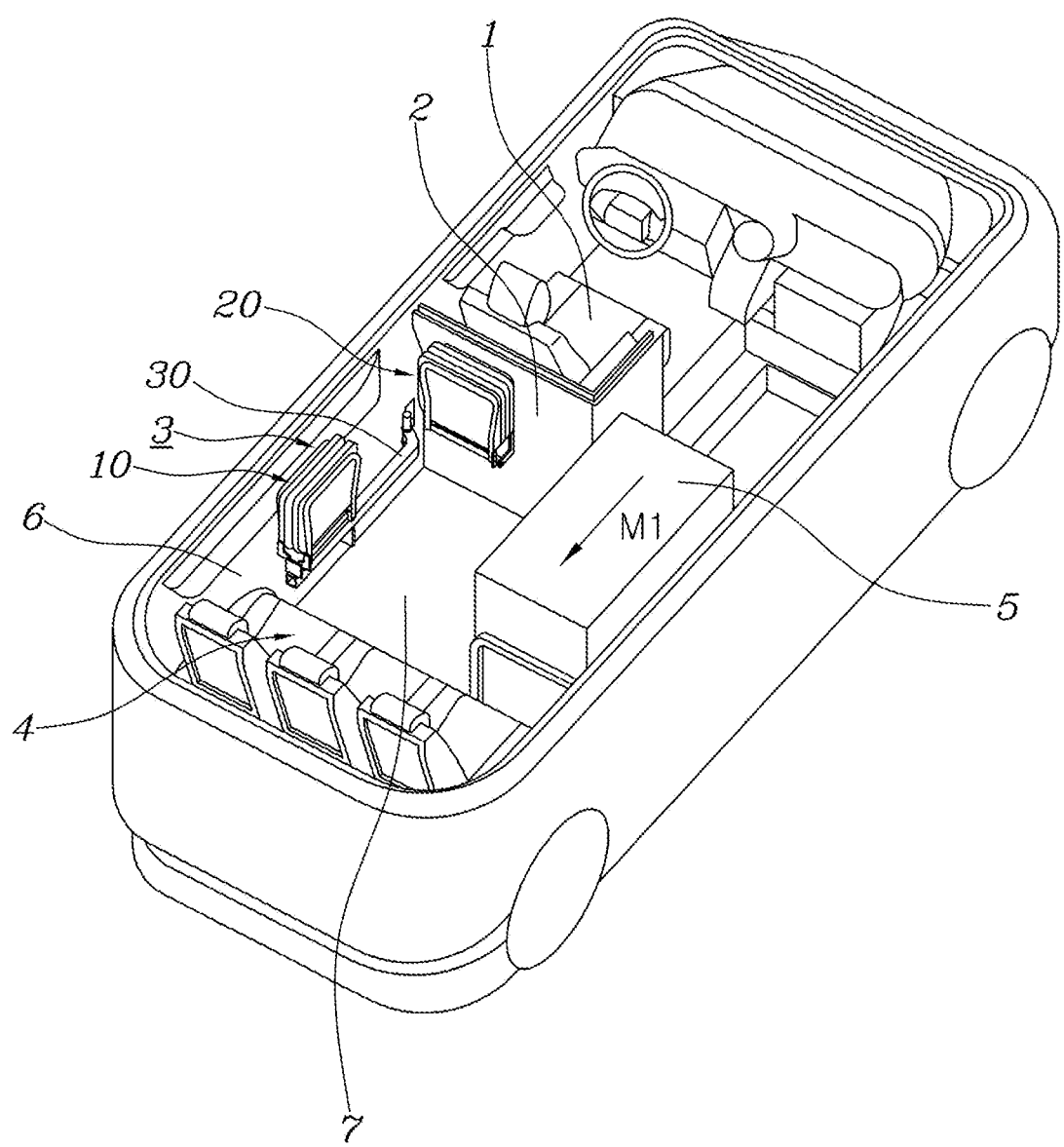
Figure 10:
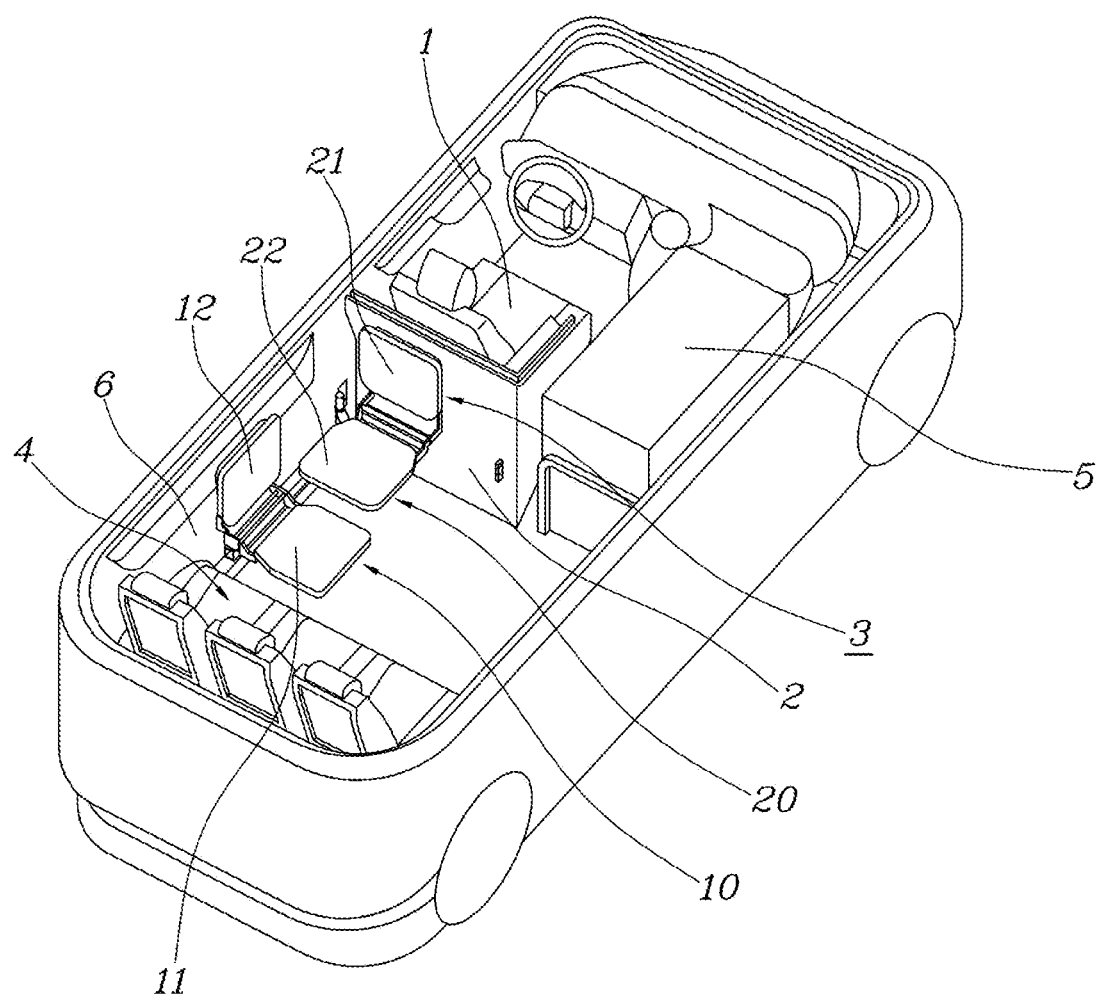

As shown in FIGS. 1 and 2, in a state where the second row center seat 10 is located at the partition wall 2 and locked to the partition wall 2, the first seating portion 11 may be brought into close contact with the partition wall 2. As shown in FIGS. 5, 9, and 10, in a state where the second row center seat 10 is located at the vehicle body side part 6 and locked to the vehicle body side part 6, the second seating portion 12 is brought into close contact with the vehicle body side part 6.

As shown in FIG. 9, in a state where the second row center seat 10 is moved to and locked to the vehicle body side part 6, the cushion part 22 of the second row side seat 20 may be tipped up and unfolded upward and the second seating portion 12 of the second row center seat 10 may be tipped up and unfolded upward. In the above state, the carrier 5 located in the space of the front passenger seat at the side portion of the driver seat 1 is movable by sliding rearward along arrow M1, and herein, a front seat luggage take-out mode is implemented.

Finally, as the two-way striker 40 is coupled to the second latch 60 on the vehicle body side part 6, the second row center seat 10 may be moved toward the vehicle body side part 6 and locked to the vehicle body side part 6, as shown in FIG. 10. In the above state, when the cushion part 22 of the second row side seat 20 is rotated rearward and unfolded longitudinally and the first seating portion 11 of the second row center seat 10 is rotated sideways and unfolded transversally, a bed mode in which the rest of the occupant is possible by using the cushion part 22 of the second row side seat 20 unfolded longitudinally and the first seating portion 11 of the second row center seat 10 unfolded transversally and the third row seats 4 is implemented.

As described above, the seat for a vehicle according to the present disclosure may include the second row center seat 10 and the second row side seat 20 that are mounted using the partition wall 2 behind the driver seat 1. Among the seats, the second row center seat 10 has the movable structure, so that the mounting location of the second row center seat 10 is movable toward the partition wall 2 or the vehicle body side part 6 when necessary. Therefore, as the usability of the second row seats 3 is increased, the productivity of the seat can be improved, and specifically, the rearward sliding movement of the carrier 5 located in the space of the front passenger seat is possible, and the convenience in the work of storing and taking out luggage using the carrier 5 can be improved.

Although the preferred embodiments of the present disclosure have been disclosed for illustrative purposes, those skilled in the art will appreciate that various modifications, additions, and substitutions are possible, without departing from the spirit and scope of the present disclosure.

What is claimed is:

1. A seat for a vehicle, the seat comprising:
    a second row center seat and a second row side seat that are mounted to a partition wall located behind a driver seat and are configured to face third rows seats,
    wherein the second row center seat is mounted in a rotatable structure, and configured to be changed in a location thereof into a locked state to the partition wall or to a vehicle body side part between the second row seats and the third row seats.

2. The seat of claim 1, wherein when the second row center seat is locked to the partition wall, the second row side seat is located at a side portion of the vehicle body side part, and the second row center seat is located at a side portion of the second row side seat.

3. The seat of claim 1, wherein the second row side seat comprises:
    a seatback part securely mounted to the partition wall to be immovable; and
    a cushion part configured to perform tip-up movement such that the cushion part is rotatably unfolded or folded upward with respect to the seatback part.

4. The seat of claim 3, wherein:
    the second row center seat is coupled to a main pipe; and
    a first end of the main pipe is rotatably coupled to the vehicle body side part by a medium of a shaft.

5. The seat of claim 4, wherein the second row center seat is configured to be changed in a location thereof toward the partition wall and the vehicle body side part by rotation of the main pipe.

6. The seat of claim 5, wherein a two-way striker protruding toward opposite sides of the main pipe is securely coupled to the main pipe.

7. The seat of claim 6, wherein the partition wall and the vehicle body side part are respectively coupled to a first latch and a second latch that are coupled to the two-way striker and maintain a locking state.

8. The seat of claim 7, wherein the second row center seat comprises a first seating portion and a second seating portion coupled to the main pipe to be rotatable with respect to the main pipe.

9. The seat of claim 8, wherein the first seating portion and the second seating portion are configured to perform tip-up movement such that the first seating portion and the second seating portion are separately rotated and unfolded perpendicularly to each other or folded upward and overlap each other.

10. The seat of claim 9, wherein a gas spring connecting the first seating portion to the second seating portion is configured to allow the first seating portion and the second seating portion to perform separate tip-up movements.

11. The seat of claim 9, wherein in a state where the two-way striker is coupled to the first latch on the partition wall, when the first seating portion stands up vertically and the second seating portion is unfolded longitudinally, an occupant is able to sit on the second seating portion unfolded longitudinally.

12. The seat of claim 9, wherein in a state where the two-way striker is coupled to the second latch on the vehicle body side part, when the second seating portion stands up vertically and the first seating portion is unfolded transversally, an occupant is able to sit on the first seating portion unfolded transversally.

13. The seat of claim 9, wherein in a state where the two-way striker is coupled to the first latch on the partition wall, when the cushion part of the second row side seat and the second seating portion of the second row center seat are unfolded longitudinally, a seating mode where an occupant is able to sit in a rear-facing posture using the cushion part of the second row side seat and the second seating portion of the second row center seat unfolded longitudinally is provided.

14. The seat of claim 9, wherein in a state where the two-way striker is coupled to the first latch of the partition wall, the cushion part of the second row side seat is tipped up and folded upward.

15. The seat of claim 14, wherein when the second seating portion of the second row center seat is tipped up and folded upward, a rear seat luggage loading mode is implemented in which luggage is loadable in a rear seat space between the second row seats and the third row seats.

16. The seat of claim 9, wherein in a state where the two-way striker is coupled to the second latch on the vehicle body side part, when the cushion part of the second row side seat is tipped up and folded upward and the second seating portion of the second row center seat is tipped up and folded upward, a front seat luggage take-out mode where rear sliding movement of a carrier in a front passenger seat space is possible is provided.

17. The seat of claim 9, where in a state where the two-way striker is coupled to the second latch on the vehicle body side part, when the cushion part of the second row side seat is unfolded longitudinally and the first seating portion of the second row center seat is unfolded transversally, a bed mode where an occupant is able to rest using the cushion part of the second row side seat and the first seating portion of the second row center seat and the third row seats is provided.

18. A vehicle comprising the seat of claim 1.

* * * * *